Jan. 12, 1971     L. G. DORSETT     3,553,852

METHOD AND APPARATUS FOR RESPONSE DISCRIMINATION

Filed Jan. 24, 1968     5 Sheets-Sheet 1

INVENTOR.
LOYD G. DORSETT

BY
Dunlap and Laney
ATTORNEYS

Jan. 12, 1971 L. G. DORSETT 3,553,852
METHOD AND APPARATUS FOR RESPONSE DISCRIMINATION
Filed Jan. 24, 1968 5 Sheets-Sheet 4

INVENTOR.
LOYD G. DORSETT
BY
Dunlap and Laney
ATTORNEYS

INVENTOR.
LOYD G. DORSETT
BY
*Dunlap and Laney*
ATTORNEYS 3,553,852
METHOD AND APPARATUS FOR RESPONSE
DISCRIMINATION
Loyd G. Dorsett, Norman, Okla., assignor to Dorsett Industries, Inc., Norman, Okla., a corporation of Oklahoma
Continuation-in-part of application Ser. No. 673,676, Oct. 9, 1967. This application Jan. 24, 1968, Ser. No. 700,112
Int. Cl. G09b 7/02
U.S. Cl. 35—9
16 Claims

ABSTRACT OF THE DISCLOSURE

Method and apparatus for use in attendance with teaching machines, oral lectures or such for constructing a verbal response for comparison with a known or correct response. The method utilizes unique discrimination functions wherein all correct answers are accepted as correct and a high order of incorrect answers are rejected as incorrect, the infrequent acceptance of an incorrect answer as correct being practically immaterial in a highly prompted question-answer system. The apparatus utilizes various binary selection devices of greatly reduced complexity for construction of a verbal response, either typewritten, oral or hand-printed, the constructed response then being compared with selected binary characteristics of a predetermined verbal response which represents a correct answer.

CROSS-REFERENCE TO RELATED APPLICATION

This application constitutes a continuation-in-part of copending U.S. application Serial No. 673,676 entitled "Aural/Visual Information System," filed on Oct. 9, 1967 in the name of Loyd G. Dorsett, now Patent No. 3,481,052, issued Dec. 2, 1969.

BACKGROUND OF THE INVENTION

(1) Field of the invention

The invention relates generally to programmed instruction of subjects and, more particularly, but not by way of limitation, it relates to an improved method and apparatus for effecting a verbal response and for evaluating the response relative to a known answer.

(2) Description of the prior art

The prior art includes various types of mechanism for signalling a response to a question which may be presented orally, i.e. by spoken or audio playback, or visually, as by printed word or other visual presentation. The majority of the previously known response devices function in the manner of multiple choice answer selection, some even extending to include multiple choice response wherein order of choice and number of choices become an additional factor. Still other forms of response device require a verbal response which may be constructed as by typewriter keyboard or such, e.g. some of the well-known computer-assisted instruction systems employ such answer input schemes.

SUMMARY OF THE INVENTION

The present invention contemplates a method and apparatus which provides a constructed verbal response which may be automatically discriminated with respect to a correct response in accordance with a particular program. The invention functions with optimal simplicity to automatically discriminate constructed verbal responses so that, when employed with prompted training systems, it recognizes all correct answers and such a high order of incorrect answers that an occasional failure to recognize an incorrect answer becomes negligible.

The apparatus consists of means for sensing a limited number of selected binary characteristics of a constructed verbal response, the response being either keyed, spoken or hand written in form, and thereafter storing or combining the binary characteristics for input to an electronic register means. A correct response code of similar binary characteristics is derived from a program source, any of various forms of teaching machine or such, and these too are applied as input to the electronic register means to derive an output indicating electronically the correctness or error of the constructed verbal response.

Therefore, it is an object of the present invention to provide a method for automatic discrimination of a constructed verbal response which is simple yet highly efficient in prompted teaching situations.

It is also an object of the invention to provide apparatus for constructing a verbal response for comparison with a program source, such constructed response being formulated by either a printing keyboard, the spoken word, or printed words, aligned in particular printing blocks.

It is a further object of the present invention to utilize discrimination apparatus which has a nominally high order of capability to discriminate an incorrect response, but when considered with respect to both the correct and incorrect responses in highly prompted situations as is usual in association with teaching devices, it has an extremely high order of capability to discriminate the incorrect responses.

Finally, it is an object of the present invention to provide a method and apparatus for discrimination of constructed verbal responses wherein the capability for response discrimination varies as a direct function of the number and type of selected binary characteristics utilized in the discrimination process.

Other objects and advantages of the invention will be evident from the following detailed description when read in conjunction with the accompanying drawings which illustrate the invention.

GENERAL

Figure 1:
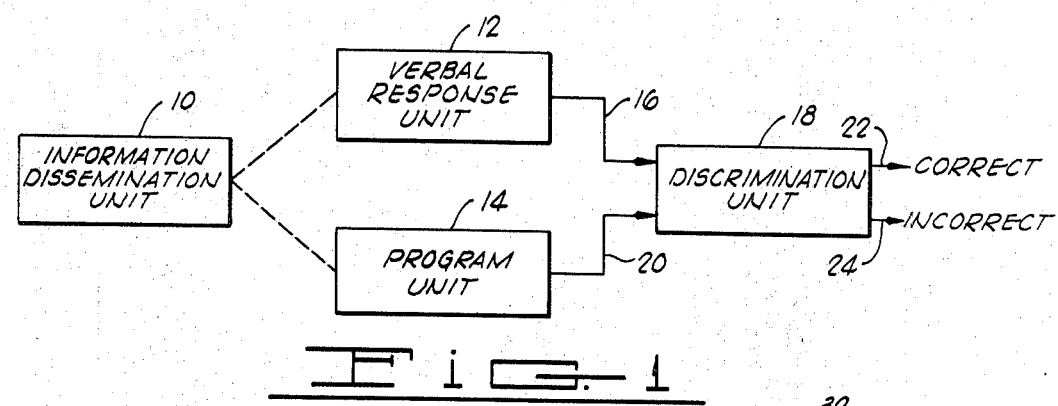
FIG. 1 is a functional block diagram depicting the general method of the invention.

FIG. 1 illustrates broadly a system utilizing constructed verbal response capability with subsequent discrimination as against a program sequence. An information dissemination unit 10 is employed to present information to the subject. Information dissemination unit 10 may be a classroom lecture or one of the many types of audio/visual teaching machine, and it may be directed to either one or a plurality of subjects. Each subject or group of subjects is given control of a verbal response unit 12 which may be employed to construct a verbal response in answer to a specific query presented through information dissemination unit 10. A correct response code or whatever is simultaneously controlled through a program unit 14 in accordance with the program output from information dissemination unit 10.

A constructed verbal response from response unit 12 is applied as an electrical signal on input 16 to one input of a discrimination unit 18; and, an electrical signal representative of the correct answer is applied via lead 20 to another input of discrimination unit 18. The discrimination unit 18, a conventional form of electronic register or such, then evaluates the two electrical input signals on leads 16 and 20 to derive an indication of the correctness of the constructed verbal response. Thus, a proper signal match will enable a "correct" output on lead 22 while an error detection or failure to provide a signal match will provide an "incorrect" output on lead 24.

While verbal responses may be much preferred, especially for teaching certain information categories, very complex equipment is required to handle such constructed responses. Thus, the pre-existing systems generally favor the much less complex circuitry or mechanism which is required by such as the easily automated multiple-choice response operation. The present invention succeeds in enabling constructed verbal response capability with relatively simple circuitry by taking advantage of the fact that most teaching systems are highly prompted, due to the nature of the operation, and that a relatively infrequent incorrect answer can be accepted as correct so long as all correct answers are so indicated. Audible reinforcements tend to prevent any serious misinformation of the student.

Such simplification is carried out by limiting the discrimination capability of a response system to, for example, 100 to 1 chances of not rejecting an incorrect response while, at the same time, virtually insuring that all correct responses are accepted. Due to the fact that students are subject to a fairly high degree of error as compared to machines which are designed for perfect discrimination, it is possible to relax somewhat the design criteria for discrimination capability. Such diminishing of the discrimination potential within tolerable limits can greatly reduce the cost and complexity of the verbal response system.

Since response discrimination is exponential to information capacity, a useful degree of discrimination may be obtained from only a moderate number of binary units of information. For example, one may find that since responses in programmed instruction are highly prompted, only one response in ten is an error (90% correct); and therefore, it may well be adequate to provide a system which always accepts correct responses, but fails to reject one incorrect response for every 250 incorrect responses. That is, and considering the relation of the incorrect response with respect to all responses, only one incorrect response or failure to recognize an incorrect response will occur for every 2500 responses entered by the student. Such a failure to reject a rare incorrect response would be unimportant, and this is especially so, since the tutoring program would usually provide a meaningful reinforcement only for the correct response.

Binary character recognition employing only eight binary information units can render a discrimination capability of 250 to 1 since $2^8$ is equal to 256. Various means may be employed to effect the 8 bit recognition, this depending upon the manner of making verbal response and selection of binary characteristics. Not every means employing eight bits will achieve the maximum possible discrimination performance; however, any discrimination of a substantial part of that theoretical maximum is adequate for use with a highly prompted teaching program. Verbal response units employing both oral and printed responses will be more fully described below.

Figure 2:
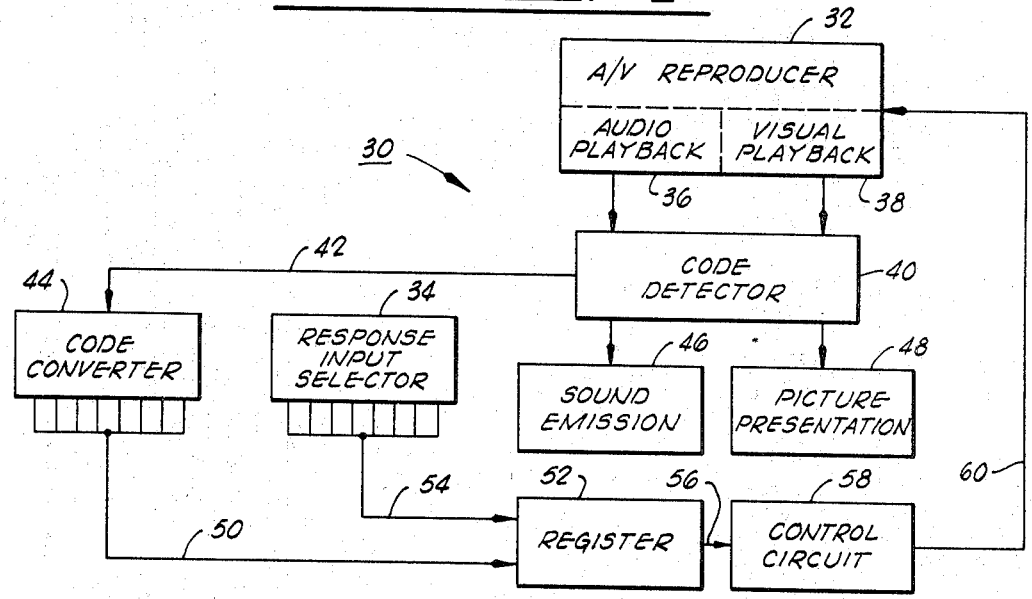
FIG. 2 is a block diagram showing utilization of the invention with an audio-visual type of teaching machine.

Referring now to FIG. 2, an audio/visual tutoring system 30 disseminates information through an audio-visual reproducer 32 and students may enter constructed verbal responses through one or more response input selectors 34. The audio/visual reproducer 32 may consist of a conventional teaching machine such as the type which includes an audio playback 36 and a visual playback 38. The audio playback 36 and visual playback 38 are both shown as being associated with a code detector 40 which functions to detect the coded answer information to provide an input via lead 42 to a code converter 44. Sound emission 46 and picture presentation 48 continue unaffected by removal of code information. Thus, numerous coding devices may be employed utilizing both audio and visual channels; for example, the system may employ a combination of code tones present or absent on an audio track, or it may employ certain areas of the visual presentation for carrying light or darkened sections which provide binary indications. Still other known types of magnetic or conductive coding schemes may be employed. In any event, each successive verbal response required by the audio/visual reproducer 32 will be detected in the form of plural ones of selected binary characteristics by code detector 40 and code converter 44, the selected binary inputs then being applied via lead 50 to a conventional form of electronic register 52.

A constructed verbal response as effected by the student is entered through response input selector 34 such that a similar group of binary characteristics is applied as input via lead 54 to register 52. The register 52 then provides an output 56 indicating whether the constructed verbal response is correct or incorrect and so activating a control circuit 58 which, in turn, provides control output on lead 60 for return to the audio/visual reproducer 32 for whatever designated control functions.

DESCRIPTION OF A FIRST EMBODIMENT

Figure 3:
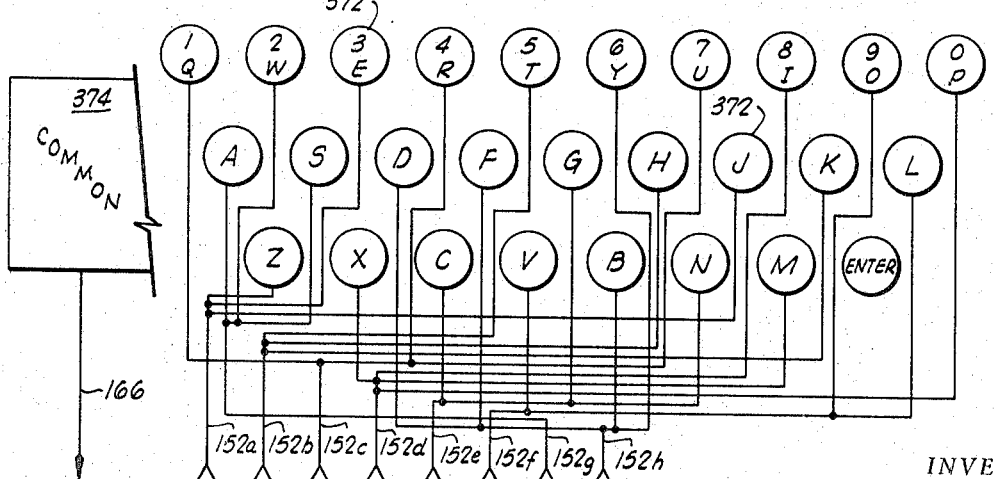
FIG. 3 is a detailed block diagram of an audio-visual teaching machine utilizing a plurality of discrete frequencies for tone coding.

A tutoring system 70 in FIG. 3 consists of an audio/visual reproducer 72 connected through a tutoring adapter unit 74 to a series of binary answer circuits 76a through 76n. The audio/visual reproducer 72 is one similar to that disclosed in the aforementioned U.S. patent application Ser. No. 673,676. It should be understood that any of various types of audio/visual reproducer may be employed as audio/visual reproducer 72 and, while the FIG. 3 embodiment employs plural tone control signal coding, any of various forms of coding may be utilized.

Thus, the audio/visual reproducer 72 may employ a disc record and a film strip projector, the audio and visual information presentation being effected in coordinated manner. Audio playback is through a record pick-up head 78 for conduction through an emitter follower stage 80 to a conventional form of audio amplifier 82. One output 84 from amplifier 82 is applied to an emitter follower output 86 which, in turn, drives an audible reproducer such as loud speaker 88. A second output 90 from amplifier 82 applies signal to a tone discriminator 92 which provides actuating output on lead 94 to a tone amplifier 96 in response to any control tone played back. A third output 98 from amplifier 82 applies control tone signal through a tone gate 100 and tutoring adapter 74 as will be described.

Control tone output from tone amplifier 96 is applied to activate a phonograph stop multivibrator 102 which is activated to provide an output 104 for control of phonograph driver 106. The phonograph driver 106 then removes drive energization from the phonograph motor 108, this initiating a question-response interval. The output from phonograph driver 106 is also applied via lead 110 to enable a mono-stable error multivibrator 112 which functions in conjunction with the tutoring adapter circuit 74. Similarly, film advance information from tutoring adapter 74 is applied (as will be described) via a lead 114 to energize a film strip driver 116 which, in turn, provides power to the film strip motor 118 to advance the visual record to its next frame of presentation. A cam switch 120 connected via a mechanical linkage 122 to film strip motor 118 provides certain switch actuation after each frame shift of the film strip. An actuation of cam switch 120 denotes completion of the driving of film strip to the new frame and an electrical indication is conducted via lead 124 for the purpose of resetting the phonograph stop multivibrator 102.

The tutoring adapter 74 provides interconnection between the audio/visual reproducer 72 and a plurality of the binary answer units 76a–76n. Tone input on lead 98 is conducted through tone gate 100 and gated tone signals are applied on lead 126 for input to respective tone filters 128a–n. The tone filters 128a–128n are each comprised of a different, narrow band-pass filter which is tuned to accept one specific frequency of the ones selected as tone coding frequencies. Thus, the number of different code frequencies selected would depend upon the binary code employed and this, in turn, would dictate the number of code channels 76a–76n and their respective tone filters 128a–128n.

A parallel tone signal output on lead 98 from audio amplifier 82 is also applied as reset to a monostable multivibrator 130 which is triggered by phonograph stop input on a lead 132 from phonograph stop multivibrator 102. Triggering of the multivibrator 130 results in a gate enabling output on lead 134 for application to tone gate 100 and the opposite conduction output on lead 136 provides an output on lead 140 which is applied back to the phonograph driver 106 for the purpose of continuing phonograph motor energization for a short duration after initial stop indication to insure playback of the associated control tone signals. The output 136 from multivibrator 130 is also applied to a reset driver 142. The reset driver 142 receives an input on lead 144, the output from error multivibrator 112 in the audio/visual reproducer 72. Thus, the reset driver 142 is energized by either an error indication on lead 144 or actuation of multivibrator 130 to generate an output reset pulse on lead 146 for application as will be described below.

The respective tone filters 128a–128n each provide an output for application to energize respective code multivibrators 148a–148n. The code multivibrators 148a–148n are each reset by a pulse derived from cam switch 120 and applied via lead 150 to respective reset inputs and, when energized, code multivibrators 148a–148n provide an output on leads 152a–152n to energize respective key switch multivibrators 154a–154n. The key switch multivibrators 154a–154n are each reset by the voltage from reset driver 142 via input lead 146 to respective reset inputs. Outputs 156a–156n of key switch multivibrators 154a–154n are applied to 158 which energizes a film advance circuit 160 in the tutoring adapter unit 74. The film advance circuit 160 applies energization on lead 114 to the film strip driver 116. Opposite conduction outputs 162a–162n are each connected to respective key switches 164a–164n and each of the switches is connected to a lead 166 to the input of error multivibrator 112.

Figure 4:
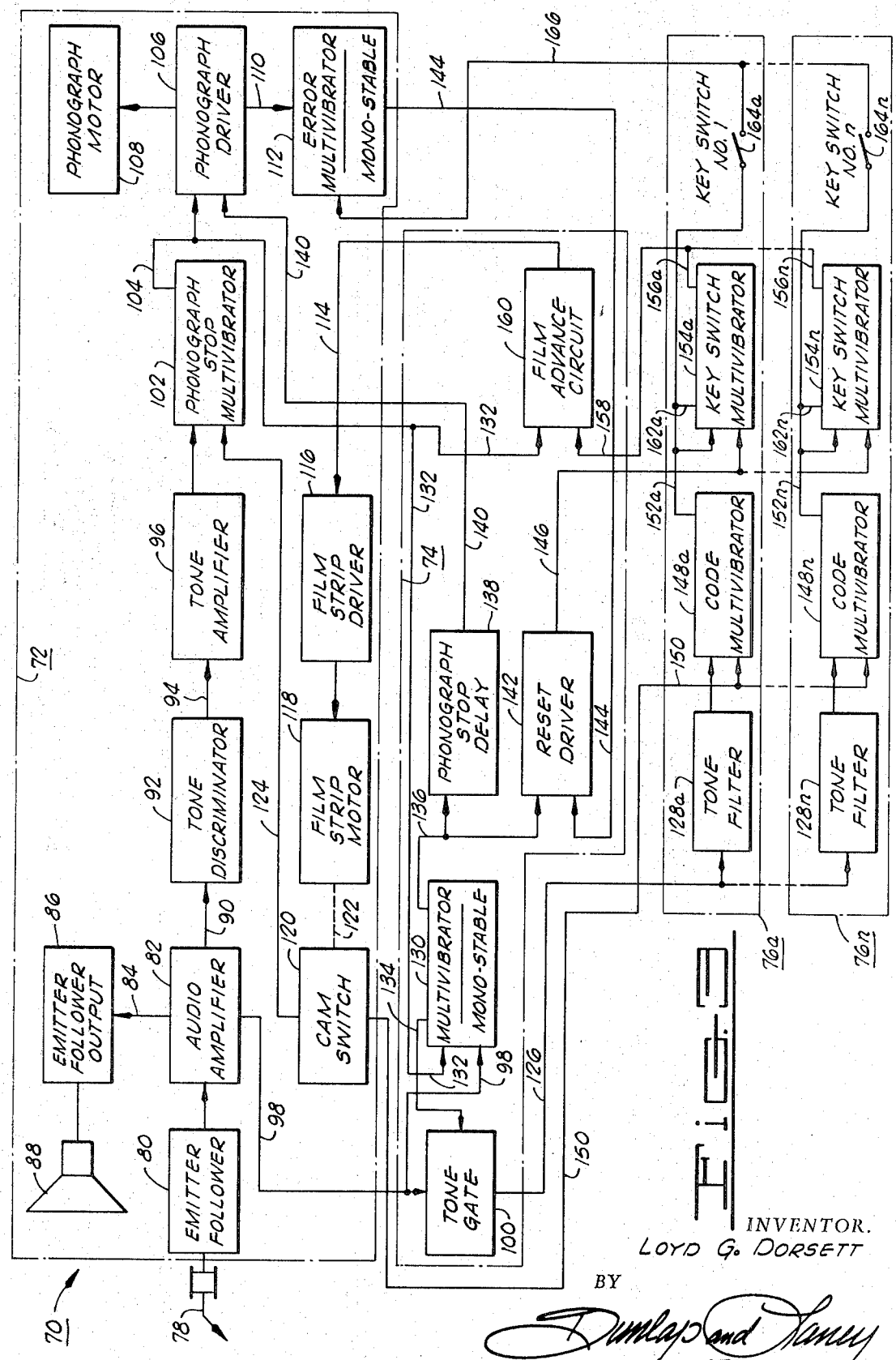
FIG. 4 is a schematic diagram of an adapter unit and tone discrimination circuitry of FIG. 3.

FIG. 4 shows the circuitry of tutoring adapter 74 and binary answer code channel 76a in greater detail. A negative voltage supply is connected to a negative voltage lead 170 which is connected to place energizing voltage on the circuitry. Return is effected through a common or ground lead 172. Audio input on lead 98 is applied through a capacitor 174 and series-connected resistor 176 to input junction 178.

A pair of PNP-type transistors 180 and 182 are connected as a monostable multivibrator. Transistors 180 and 182 are connected common-emitter through a resistor 184 to ground while the collectors are connected through respective load resistors 186 and 188 to the negative voltage supply lead 170. The base of transistor 180 is connected through a series-connected resistor 190 and capacitor 192. The base of transistor 182 is connected through a resistor 194 to ground and through a resistor 196 to the input junction point 178 which is connected to the collector of transistor 180. The base of transistor 180 is biased by connection through a resistor 198 to the negative supply lead 170 and also through a capacitor 300 and series-connected resistor 202 which conducts the phonograph stop output present on lead 132.

A voltage divider comprised of series-connected resistors 204 and 206 is connected between respective collectors of transistors 180 and 182 to develop an output via lead 208 and a capacitor 210 for input to the base of a PNP-type transistor 212, a code tone amplifier. Transistor 212 is connected common-emitter with the emitter connected through a resistor 214 to ground and with its collector connected through a resistor 216 to the negative supply lead 170. Tone code output is then derived from the collector through a capacitor 218 for application via lead 126 to respective inputs of the code channel units 76a–76n.

The input junction 178 is also connected to apply control tone input through a resistor 220 for input to a base of a PNP-type transistor 222. Parallel-connected resistor 224 and capacitor 226 are connected between ground and the base of transistor 222 to provide a timing function. Thus, transistor 222 is connected with the emitter directly to ground and with its collector connected via lead 140 to phonograph driver 106 (FIG. 3) such that driver 106 is maintained energized for a brief interval after phonograph stop multivibrator 102 is flipped.

Tone input present at junction 178 is also applied through a diode 228 for input to the base of a PNP-type transistor 230, a reset driver stage. Transistor 230 has the collector connected directly to negative voltage lead 170, the base biased from ground by a resistor 232, and a resistance 234 and bypass capacitor 236 connected between emitter and ground, the output being taken directly from the emitter on lead 146. The reset driver transistor 230 may be actuated by tone control signal input through diode 228 or, alternatively, it may be actuated by an output indication from error multivibrator (see FIG. 3) present on lead 144 through a diode 238.

A PNP-type transistor 240 constitutes a film advance on "nor" gate. The base of transistor 240 is biased from ground through a resistor 242 and control input is via lead 158 from a key switch multivibrator, to be further described. The emitter of transistor 240 is connected directly to ground and the collector is connected through a load resistor 244 to the negative voltage supply. Collector output is taken through a resistor 246 for application on lead 114 which energizes film strip driver 116 (see FIG. 3). A PNP-type transistor 248 makes up a film advance "inhibit" circuit which acts in concert with the "nor" gate transistor 240. Transistor 248 is also connected common-emitter with the base biased from ground lead 172 by a resistor 250 and base input is received through a resistor 252 on input lead 132 from the phonograph stop multivibrator 102 (FIG. 3). The collector of transistor 248 is connected directly to the collector of "nor" gate transistor 240 with loading through common resistor 244 to the negative voltage lead 170 such that a signal input on lead 132 indicative of the phonograph run condition will cause an inhibit output to prevent any film advance.

Referring now to the code channel 76a, tone control signal input is present on lead 126 through a sensitivity control potentiometer 260 for input to the base of a PNP-type transistor 262, a filter amplifier stage. Transistor 262 has the collector connected directly to the negative voltage lead 170 while the base is biased from ground through a resistor 264 and the emitter is raised above ground by a resistor 266. Signal output is conducted from the emitter of transistor 262 and then applied to the base of a PNP-type transistor 268, a complementing filter stage. Transistor 268 has the collector connected through a resistor 270 to the negative voltage lead 170 while the emitter is connected through a resistor 272 with bypass capacitor 264 to ground. A filtered output signal is available from the collector 268 through a resistor 276, a junction 278 and capacitor 280 for input to the base of a rectifier-connected, PNP-type transistor 282.

Frequency selection is effected by variation of resistance and capacitance values in the frequency selective network 284. Frequency selective network 284 is connected via lead 286 to output junction 278 in the output circuit of transistor 268 to provide feedback control through a lead 288 which is connected to the base input of transistor 262. Frequency selection circuitry consists of a pair of parallel filter pads consisting of series-connected capacitors 290 and 292 with a resistor 294 connected between the capacitor junction and ground, and a second pad consisting of series-connected resistors 296 and 298 having their common junction connected to ground through a capacitor 300. The values of the resistors and capacitors in frequency selective network 284 may be varied in accordance with the frequency of control tone signals which are utilized. In one form of the invention operating with eight bit binary verbal characteristics, eight such control tone signals are utilized; tone frequencies which have proven to function to good advantage are hertz values of 100, 150, 220, 330, 470, 680, 1000 and 1500. Thus, the values of resistance and capacitance in respective ones of frequency selective networks 284a–284n would be varied accordingly to provide selection of each respective code frequency.

Rectifier transistor 282 receives base input from capacitor 280 as the base is biased from the negative lead 170 by means of a resistor 302. The emitter is connected directly to ground while the collector is connected through a lesser value of resistance 304 to negative supply lead 170. Output is derived from the collector through a resistor 306 to an input junction 308 which leads to the code multivibrator 148a comprised of PNP-type transistors 310 and 312.

Transistors 310 and 312 are connected in bi-stable multivibrator configuration with emitters connected directly to ground, bases connected to ground through respective resistors 314 and 316, and collectors connected through respective resistors 318 and 320 to the negative voltage supply lead 170. The collector of transistor 310 is connected to the base of transistor 312 through a resistor 322 and, in like manner, opposite collector-base connection is made through a resistor 324. The input junction 308 is grounded through a capacitor 326, and it is also connected through a resistor 328 to the base of transistor 312. A reset input from cam switch 120 (FIG. 3) is provided on input lead 150 through a resistor 330 to the base of transistor 310. A flip-flop output is then available from the collector of transistor 312 through a diode 332 and lead 334 to one side of key switch 164a. A second flip-flop output is also taken from the collector of transistor 310 through a lead 336 for application through a resistor 338 directly to the base of a transistor 340 in the key switch multivibrator 154a (see also FIG. 3).

The key switch multivibrator 154a is comprised of a pair of PNP-type transistors 340 and 342 which are connected for bi-stable operation in a manner similar to the code multivibrator 148a. That is, the emitters are connected directly to ground lead 172 with the bases connected through respective resistors 334 and 346 to ground lead 172, and the collectors are connected through respective resistors 348 and 350 to the negative supply lead 170. Collector-base interconnection is made from the collector of transistor 342 through a resistor 352 to the base of transistor 340 and, in like manner, connection is made from the collector of transistor 340 through a resistor 354 to the base of transistor 342. A reset input is provided on lead 146 through a resistor 356 to the base of transistor 342. The opposite input or base of transistor 340 is connected through a resistor 358 to the triggering lead 334 from code multivibrator 148a as well as to one side of the key switch 164a. An output is taken from the collector of transistor 340 through a resistor 360 for conduction via lead 158 to the base of film advance "nor" gate transistor 240 thereby to exercise film advance control.

It should be understood that while specific description is given for binary code channel unit 76a, additional code channel units of the plurality would each be identically constructed except for component values in the respective additional frequency selective networks 284. Thus, the frequency selective network 284 for successive binary code channel units 76 would each be varied to respond to a preselected control tone frequency, the selections being in accordance with the number of binary characteristics and tone frequencies employed.

Figure 5:
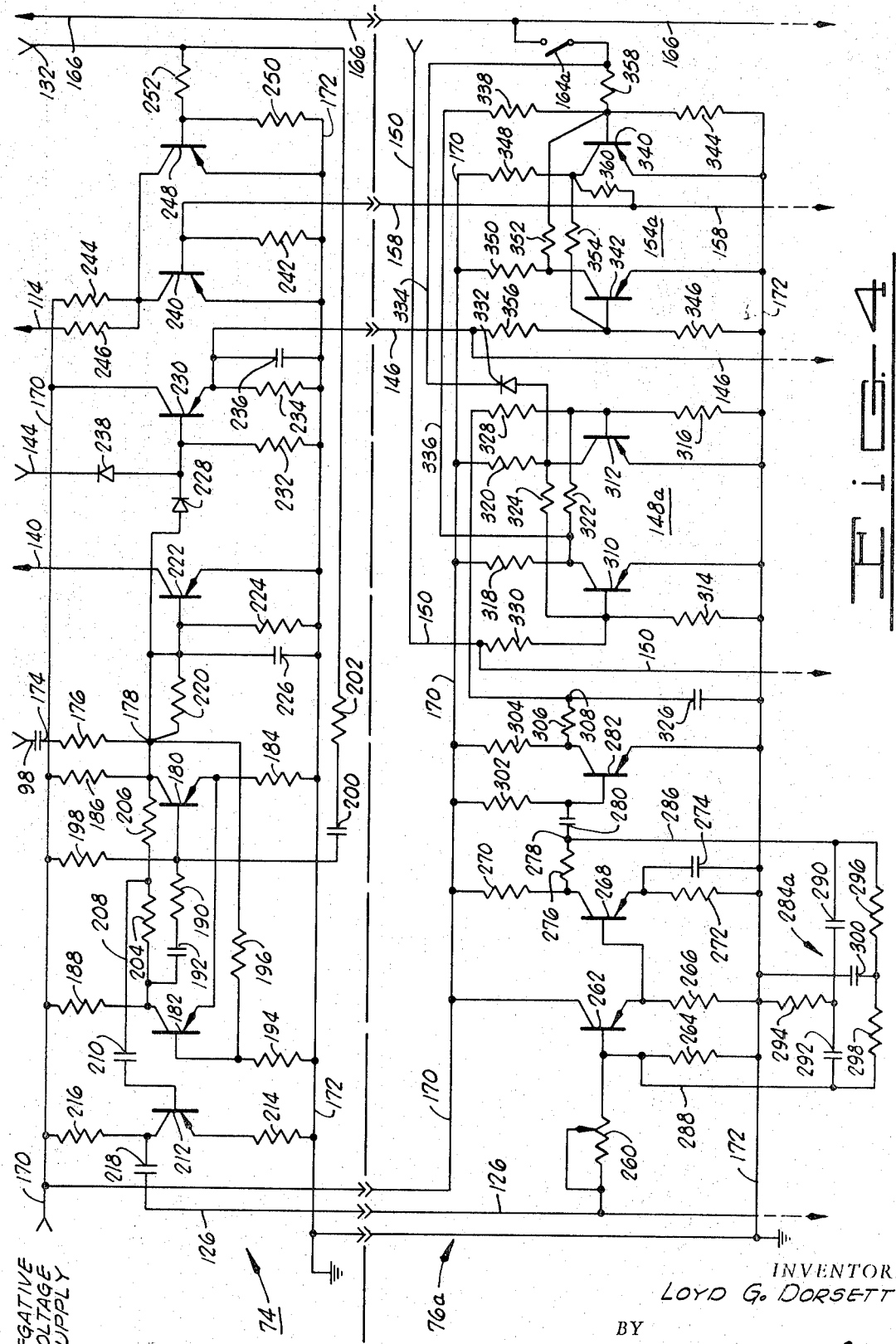
FIG. 5 illustrates a keyboard layout which may be utilized in one form of constructed response mechanism.

There are various forms of key switch control which may be employed to indicate or select binary characteristics. One form of selection mechanism is the keyboard switching arrangement which is shown in FIG. 5. Utilization of such a keyboard mechanism 370 as shown in FIG. 5 enables the student to type out one or two word responses, the binary characteristic being presence or abesnce of letters included in a correct spelling of the answer. The allocation of letters to keys 372 of the keyboard may be in the manner of typewriter letter disposition and the capability may be alphanumeric by including the ten numerals with selected ones of letter keys 372.

The division into alphanumeric groups is made in accordance with the letter or number use; that is, and depending upon the number of binary bits employed and therefore the number of letter groups required, the alphanumeric characters are divided into plural groups which find approximately the same frequency of use in whatever the language or system of information conveyance which is employed. Thus, in the case of an English language tutoring system, cryptanalysis sources may be consulted to procure data both as to letter frequency and letter combination frequency. Then the 26 letters of the English alphabet plus the ten numerals may be grouped or shared among the eight addresses (in the case of an eight bit response system) in a manner such that the probability of usage of each group is about equal. Such grouping may be effected by selecting eight of the most frequently used letters to be combined with the eight least used, thereafter distributing the other ten suitably so that each one of the eight locations is used about the same amount. It is also advantageous to insure that the groupings include the most common letter combinations such as "qu," "ng," etc.

Cryptanalysis sources provide information as to the percent of use for each letter as considered in view of the entire English language. For example "e" is used 12.6%, "t" is used 9%, "r" is used 8.3%, "i" is used 7.6%, etc. A suggested letters-to-key assignment might be that which is shown in FIG. 5 wherein groupings and their respective percentages are as follows: EJZ–12.9%; THK–12.6%; RU–12.1%; IMPX–12.8%; NCG–12.7%; OLV–12.3%; ASW–12.6%; 1 and DFYB–12.0%. The keyboard layout may be patterned after that employed on conventional typewriters with numerals shared along the top row of letters. Each of the group energizing leads 152a–152h is connected through a respective one of the above letter groupings and a key press makes connection between the respective letter group lead and a common buss or contactor 374 which may be connected for return on lead 166 to actuate the error multivibrator 112 (see FIG. 3). Any of various conventional switching arrangements may be employed to provide a switching contact between respective ones of groups of letter keys 372 and the common contact 374. Further, an "enter" button 376 may be included for the purpose of clearing any incomplete address entries.

OPERATION

The operation is described with reference to FIGS. 3, 4 and 5 employing an audio/visual reproducer 72 similar to that fully disclosed in the aforementioned copending patent application, U.S. Ser. No. 673,676. Such an audio/visual reproducer 72 functions to project visual information from a film strip while coordinated audio information is reproduced from a disc record. The disc record may be one employing a series of related audio information segments intersticed with periodic code control spaces. Code information may be conveyed by a series of distinct tone signals contained in the code spaces, for example predetermined combinations of certain ones of eight different control tone signals, thus giving the system an eight bit binary code discrimination capability.

The film strip and related audio record are played back in such a manner that preselected audio and visual portions are presented along with a specific query or student requirement. Information dissemination is then halted for a brief interval in which student response takes place, and, thereafter, depending upon the result of discrimination of the student response, the audio/visual reproduction proceeds in predetermined manner.

Referring now to FIG. 3, audio information is played back through pick-up head 78 for audible reproduction through speaker 88 and, upon termination of an audio portion, the one or more control tones present in the coding interval of the record will be conducted on lead 98 through tone gate 100 to prepare the response structure. Primarly, however, a control tone signal will be transmitted via lead 90 to tone discriminator 92 to actuate phonograph stop multivibrator 102. The output of phonograph stop multivibrator 102 deenergizes phonograph driver 106 to stop phonograph motor 108 and to cease playback of the audio record material. Energization of phonograph driver 106 also provides an output via lead 110 to insure reset of the error multivibrator 112. The audio/visual reproducer 72 is then in readiness to receive some form of student response whereupon a correct indication will enable energization of the film strip motor 118 to bring the next visual matter into view and, thereafter, energization of the phonograph motor 108 to playback the next segment of coordinated audible material.

The tutoring adapter 74 and plural code channel units 76a–76n provide circuitry for conditioning predetermined addresses to receive a particular student response and, thereafter, for comparing an actual constructed verbal response to determine its correctness. One or more of the error control tone signals of different, specific frequencies is passed through tone gate 100 and via lead 126 to a respective one of tone filters 128a–128n. Each of code multivibrators 148a–148n is reset by a pulse on lead 150 from the cam switch 120 which provides output actuation upon rotation of film strip motor 118 to bring each new visual frame into view.

Respective ones of code multivibrator 148a–148n will then be actuated in accordance with which ones of tone filters 128a–128n are actuated in response to reception of an error tone signal at a particular frequency range. It should be understood that for a given verbal answer only a portion of the total number of tone filters 128a–128n will be energized, this being based upon a consideration of the nature of one or two word answers. That is, an examination of typical constructed answers in programmed texts shows a median of six to seven letters in each one-word answer, but the number of different letters in each answer are about five due to repetitions of letters, double letters, etc. Thus, assuming the eight binary addresses, the above five letters must use a minimum of two and a maximum of five addresses. More likely than this, it can be shown that an average of three or four addresses is used, the median being 3.5 addresses with an average of at least four other error addresses remaining. Therefore, at least half of the total of eight addresses will usually contain error letters not present in a correct verbal response.

Assuming, for example, a seven letter verbal response with five different letters which is an incorrect answer, then there will be five independent chances of it being detected as incorrect. This then is $2^5$ or a 32 to 1 chance that one of the five letters will cause the response to be rejected. A program which causes student errors 10% of the time then would accept an incorrect answer as correct only in 320 responses; and even in that case the program would be constructed to reinforce verbally only the correct answer, even if it had reinforced the wrong answer operationally.

Thus, for one type of design, the particular frequency of control signal will be played back to energize tone filter 128a to indicate an error with respect to a given response requirement. The code multivibrator 148a will then be placed in a first conduction state which applies ground potential on lead 152a to the key switch No. 1 (164a), and depression of the key switch 164a will then cause error multivibrator 112 to flip. Alternatively, absence of tone control signal will not flip code multivibrator 148a placing negative voltage at key switch 154a. This negative voltage flips the key switch multivibrator 154a and energizes input lead 158 to the film advance circuit 160 such that film advance is set up when all key switch multivibrators 154a–n are flipped. Thus, one or more letters on the FIG. 5 keyboard will be actuated closed by depression of key switch No. 1 (164a), these being contained in a correct constructed verbal response, but conduction of the zero or ground potential to input lead 166 will cause no actuation of error multivibrator 112. An actuation of error multivibrator 112 provide output on lead 144 to reset driver 142 which, in turn, resets all key switch multivibrators 154a through 154n.

The presence of a control tone signal on lead 98 is also applied to reset a monostable multivibrator 130. The multivibrator 130 is actuated by output from phonograph stop multivibrator 102 such that it enables tone gate 100 and energizes phonograph stop delay 138 so that a short duration of continued phonograph playback is effected, this providing an interval to insure playback of all control tone signals. The same output 136 from multivibrator 130 is applied to energize reset driver 142 which, in turn, resets all key switch multivibrators 154a through 154n prior to the constructing of a verbal response by the student.

DESCRIPTION OF AN ALTERNATIVE EMBODIMENT

Figure 6:
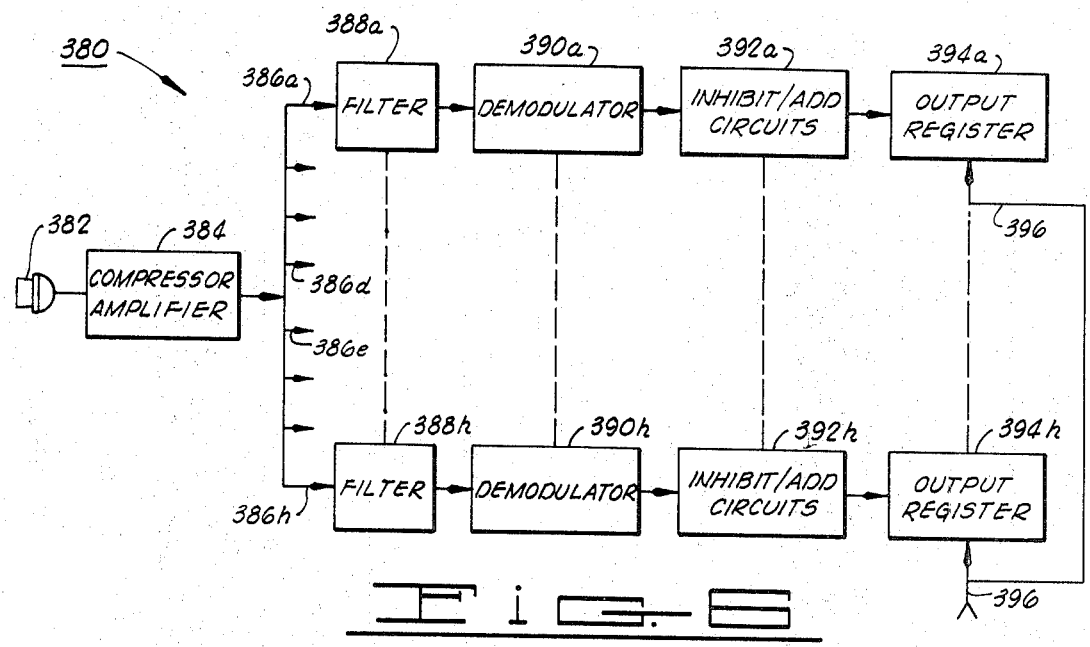
FIG. 6 is a block diagram of circuitry which performs discrimination of oral verbal response.

As shown in FIG. 6, a response system 380 provides still other capability for constructed verbal response utilizing selected binary characteristics. The response system 380 receives an oral response from the student subject and then compares predetermined binary characteristics of the spoken answer with selected binary characteristics representative of a correct verbal response. That is, an oral response may be broken down into syllable count, sibilant sounds, and/or several other easily discriminable vowel sounds, and certain combinations of these characteristic sounds may be employed to actuate storage registers for comparison with a predetermined binary code representative of a correct verbal response. It has been found that such oral responses, when adjusted to the speaker's voice and used with an eight-bit code can achieve a useful discrimination at a level of nearly 50 to 1, this figure enabling a very low discrimination failure rate when used in a highly prompted teaching system.

Figure 7:
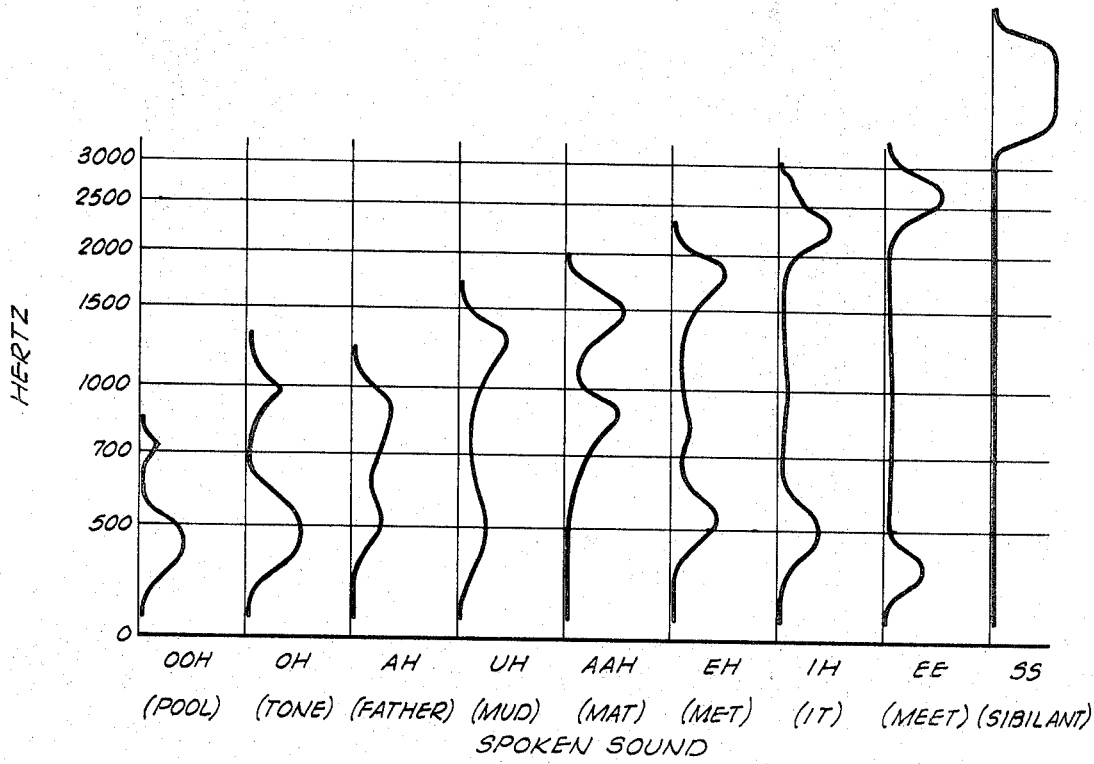
FIG. 7 is a graph depicting the frequency content of various spoken sounds.

The function of the FIG. 6 device is dependent upon certain well-known studies which classify a distribution of harmonic energy in speech for the various pure vowels and other distinctive sounds. Referring now to FIG. 7, a graph showing the frequency spectrum of various distinctive sounds, the very distinctive character of the sounds is readily apparent. For example, the sound "ee" as in "meet" has a formant centered at 2700 hertz (plus or minus 10%) and little else above 550 Hz. (cycles per second), but "ih" as in "it," a similar sound, peaks at 2300 Hz. and has a stronger 500–600 Hz. component. Further, the vowel sound "eh" as in "met," a common English language sound, has a peak near 2000 Hz. and a 500–650 Hz. peak also. These last two sounds have little energy between the measured peaks, this middle range being suppressed by an effective tuning resonance cavity formed by the tongue, palate, and roof of the mouth.

In a similar manner, "aah" as in "mat" moves the formant peaks closer together, centering at 1500 and 900 Hz., while "ah" as in "father" peaks at 850 Hz. tapering to a 450–650 Hz. formant, but it exhibits a gap between there and its primary peak at 1300 Hz. The "on" as in "tone has similar distinctive peaks as does the sound "ooh" as in pool." There may be considerable variation between speakers as to the exact location of the various formants; however, a listener soon relates the vowel sounds by their relative frequencies. Also, there is a wide variation in the voicing fundamental between men and women, and, in addition, it is normal to add meaning and expression by controlling both fundamental pitch and volume.

The circuitry of FIG. 6 is employed to differentiate between certain of the spoken sounds to derive selected binary relationships. The tutoring system 380 consists of a microphone 382 connecting its input to a compressor amplifier 384. Compressor amplifier 384 is necessitated due to the great variation in the coupling of different voices to the microphone and, therefore, compressor amplifier 384 preferably includes an automatic volume limiter which introduces as little distortion as possible. For example, this may be obtained by use of a three-stage audio amplifier having gain varied by feedback bias obtained from rectified audio output. Such circuitry enables limiting on the order of 20 db with less than five percent distortion which proves suitable for the particular application.

Plural outputs 386a–386h from compressor amplifier 384 are applied to each of a plurality of audio bandpass filters 388a through 388h of plural discrimination channels 387a–h. This array of filters consists of a plurality of different audio band-pass filters centered at, for example, hertz values of 400, 600, 900, 1300, 1700, 2200, and 2700; and finally, a high-pass filter for unvoiced sibilant sounds which accepts the sound above 3000 Hz. The output of each filter 388a through 388h is then connected to a respective demodulator circuit 390a through 390h which may also provide D-C amplification and some integration by well-known forms of capacitor circuitry.

Demodulated output is then conducted through the inhibit/add gating circuits 392a through 392h whereupon the respective outputs are applied to each of the output registers 394a through 394h. The output registers 394a through 394h merely constitute a general showing of one form of output comparison device. This may be such as a multivibrator, a part of the response code register, which is flipped or not depending on the level of the filtered signal as derived from the respective inhibit/add gating circuits 392a through 392h. The output registers 394a–h may be simultaneously reset by a suitable reset input on lead 396.

The sensitivity and selectivity of each filter 388a–h and inhibit/add gate circuit 392a–h may be adjusted to cooperate a code addressed multivibrator (output registers 394a–h) to respond uniquely to a given voice sound. This is accomplished in the inhibit/add circuits 392a–h by adding and subtracting effects at various frequency passbands. Thus, the "ee" sound may use the 2700 Hz. signal, gated, suppressed or inhibited by one or more of the lower signals. For discriminating "ee" against "ih," one may use a 2200 Hz. and a 600 Hz. gate signal. The "ih" sound at 2200 Hz. may be gated down by 2700 Hz., as well as by 900, 1300 or 1700, and various other gating schemes as will be further discussed below.

Figure 8:
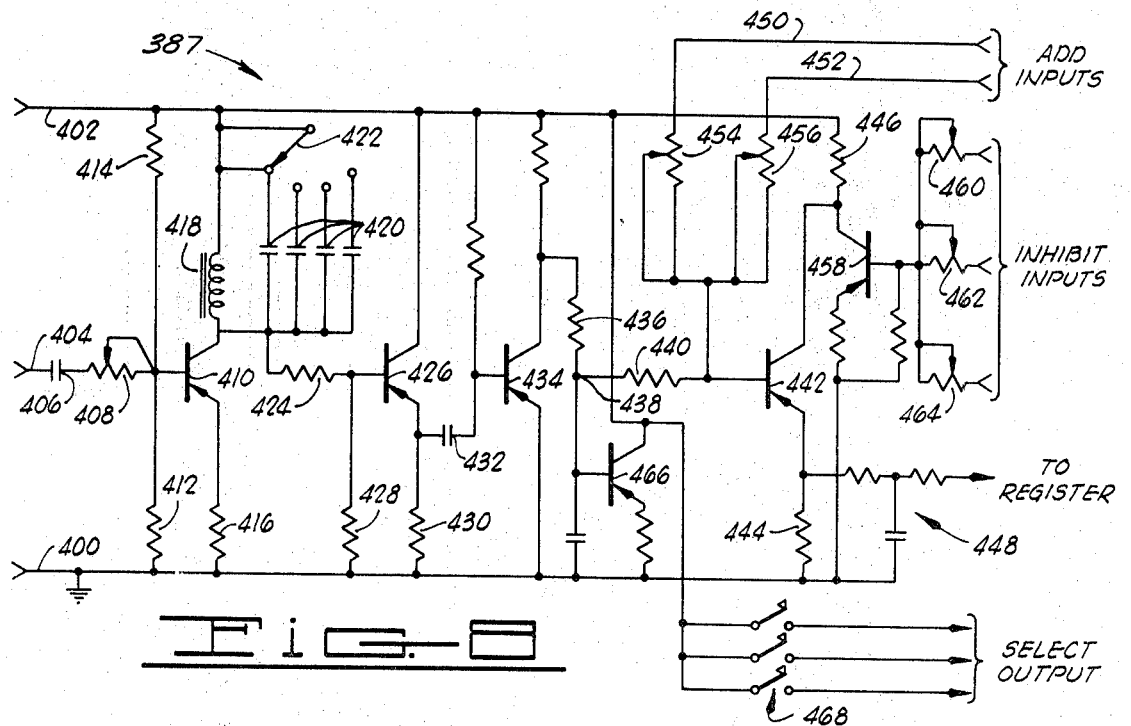
FIG. 8 is a schematic diagram of the individual tone channel circuitry employed in the block diagram of FIG. 6.

FIG. 8 is a schematic diagram of a single oral discrimination channel 387, one of eight such circuits required and an eight-bit binary response system. The system 392 receives power input between the ground or common input 400 and an energizing voltage supply 402. Signal input at 404 (386 of FIG. 6) is applied through a capacitor 406 and sensitivity adjusting potentiometer 408 to the base of a PNP-type transistor 410, a tuned amplifier. The base of transistor 410 is biased from a voltage divider consisting of series-connected resistors 412 and 414, and the emitter is connected through a resistor 416 to ground. The collector is connected to energizing voltage lead 402 through a frequency selective network consisting of a reactance element 418 and a plurality of parallel-connected capacitors 420. Different values of capacitors 420 are individually selectable by means of a rotary switch 422. An output at a frequency or passband determined by the setting of switch 422 is then available from the collector of transistor 410 through a resistor 424 to the base of a PNP-type transistor 426, an emitter follower.

Emitter follower transistor 426 is connected with the collector tied directly to voltage supply lead 402, the base biased from ground through a resistor 428, and the emitter output being developed across a resistor 430. The emitter output is applied through a capacitor 432 to the base of a rectifier-connected PNP-type transistor 434. The rectified output is taken from the collector of transistor 434 and applied through a resistor 436 to an input junction 438.

The junction 438 applies signal through resistor 440 to the base of a PNP-type transistor 442, a "gate" emitter follower stage. Thus, emitter follower 442 has its emitter connected through a resistor 444 to ground and its collector connected through a resistor 446 to the voltage supply, and it provides an output in accordance with rectified signal input from the emitter through integrating network 448 for application to its respective output register (394a–h). In addition, add inputs as derived from selected other discrimination channels 387a–h of the circuit 380 may be provided through leads 450 and 452 and respective sensitivity-adjusting potentiometers 454 and 456 for additive input at the base of the "gate" emitter follower transistor 442. Still further, the emitter follower transistor 442 is controlled by a PNP-type transistor 458, a gate driver, which is activated by one or more inhibit inputs as applied through one of the potentiometers 460, 462 or 464 for input to the base of transistors 458. Thus, inhibit inputs as derived from inhibit circuit outputs in selected other discrimination channels 387a–h may be applied through potentiometers 460, 462 and 464 to control the gate drive of transistor 458 such that the signal characteristic through integrator 448 is further varied.

A PNP-type transistor 466, an emitter follower stage, is connected to provide inhibit output for utilization in the inhibit inputs of inhibit/add circuits 392 in other discrimination channels 387, i.e., the remaining ones of 387a through 387h. A plurality of switches 468 enable selective application of the inhibit output voltages to circuits in other discrimination channels.

In operation, the response system 380 provides a limited range of machine discrimination of oral verbal responses as required by programmed audio-visual instruction. As previously described, the limited range becomes very inclusive when the oral response system is employed for entry of constructed verbal responses in a highly prompted, reinforced learning procedure.

It has been previously known to differentiate between "yes" and "no" answers, or, alternatively, between "true" and "false" answers since one word of each pair employs a sibilant sound, the hissing "ss" which is comparatively easy to isolate and detect due to its relatively high frequency in relation to the total spectrum of spoken sounds. It necessarily follows then that certain words may be highly cued for easy discrimination and the most likely incorrect response or responses to a given question are substantially different in their audio nature so that a simple discriminating circuit may serve to provide an effective reinforcing element in a learning system.

Thus, a sibilant detecting response system provides a response code utilizing two binary addresses, this providing a simple discrimination, e.g., "yes" and "no." The present circuitry of FIGS. 6 and 8 employs additional vowel filters to enable discrimination of additional words. As shown in FIG. 7, the system selects eight pure vowel frequencies which generally can be adjusted for all voice inputs so that each can be separated by simple electronic filtration for use in oral verbal response discrimination. A further identifying factor in an oral response may be the syllable count which may be detected by simple amplitude discriminators. The oral discrimination circuitry may include such syllable count circuitry; however, as the basic structure is set forth herein, only the vowel and sibilant discrimination is relied upon.

Prior to a tutoring session requiring use of the response system, the system 380 will be adjusted to accept the particular users voice to best advantage, this enabling clear definition of the required number of binary discriminating characteristics. Thus, the sensitivity of compressor amplifier 384 is preadjusted and then, as shown in FIG. 8, each channel 387 is adjusted to give optimum discrimination for a given one of the selected characteristic sounds. With respect to each channel 387, the input sensitivity potentiometer 408 is optimally adjusted and selector switch 422 presets the filter for a predetermined frequency pass band. Each of the add inputs 450 and 452 as well as the inhibit inputs 460–464 are adjusted for sensitivity and interconnected in accordance with the vowel discrimination pattern employed; likewise, the select output switches 468 may be selectively closed to provide add and/or inhibit inputs to others of the remaining channels 387. In this manner, the sensitivity and selectivity of each filter 388 and succeeding circuits of their respective channel 387, operating one of code address output registers 394a through 394h, is adjusted to respond uniquely to a given voice sound, this depending upon the adding and subtracting of effects at various frequency pass bands.

As previously stated, the frequencies employed may be selected with filters 388a–h centered at hertz valves of 400, 600, 900, 1300, 1700, 2200, 2700 and above 3000. The "ee" sound (see FIG. 7) may then be passed as an actuating signal in the 2700 Hz. range, the total signal being gated, suppressed or inhibited by one or more of the lower signals. Thus, the "ee" sound is close to the "ih" sound but may be discriminated therefrom by employing gate signals selected from the 2200 Hz. and 600 Hz. channels. Nothing else should interfere. Then, in another channel, the "ih" sound characteristic at 2200 Hz. may be gated down by a selected output from the 2700 Hz. channel and by filtered signals in other channels providing 900, 1300, or 1700 hertz signals. The vowel sound "eh" has a major formant centered at 1900 Hz. and a characteristic may be derived from either one or both of the two signal channels passing 1700 Hz. and 2200 Hz. signals respectively. The output may be gated by the 2700 Hz. channel, as well as by the outputs from the 900 Hz. through 1300 Hz. channels.

A channel may accept the "aah" sound by being tuned to pass 1300 Hz. signals suppressed by higher frequency sounds and inhibiting any 600 hertz component of sound. The "ah" sound has little above 1300 Hz., being mostly 900 Hz. with some 600 Hz., the signal being gated down by 400 and 2200 Hz. channel outputs. The "uh" as in "nut" may be based on channel output of 1300 Hz. and 600 Hz., but it should be suppressed by signals from 900 Hz., 1700 Hz. and above. The "oh" response may be distinguished at 600 Hz., inhibited by outputs from the 900 Hz. and above channels while "ooh" may be recognized at 400 Hz., gated down by all higher frequency signals. The sibilant is, of course, easily discriminated by a channel accepting input above 3000 Hz. The plural channels 387 discriminating different vowel sounds, sibilants and such may be adjusted within a reasonably wide range to accommodate voices of varying timber and pitch, whether male or female.

Correct answer address locations, e.g., the respective output registers 394a–394n, may be pre-conditioned so that only the presence of certain vowel or sibilant sounds in a spoken correct answer will properly actuate the registers. The selection of these binary characteristics may be made on the same order as for the keyboard response unit previously described. That is, for the usual one or two word answer as filled into an eight address register, on the order of three or four address locations may be devoted to correct answer information, i.e., they must be filled in response to reception of a known vowel sound or sibilant in the spoken response; and the remaining address locations may be utilized for incorrect responses so that each would actuate the output register to indicate an incorrect answer in response to predetermined vowel sounds or frequencies not known to be present in the correct answer.

Consideration should also be given to equivocal answering situations. By utilizing certain additional sound characteristics it is possible to increase discrimination capability as to similar sounding verbal answers and pronunciation differences between responding subjects. For example, the vowel sound "ih" as in "bit" may contain varying amounts of the "ah," "ee", "uh" sounds, depending upon the speaker, and it can then be advantageous to pattern the sound discrimination channels so that prohibitive sounds are primarily relied upon to convey error. That is, the vowel sound "ih" may contain various other vowel sounds as set forth above, but it should never contain such as the "o" vowel sounds for any reasonable enunciation. Accordingly, it may be desirable in certain instances to include circuitry which functions to eliminate reliance upon vowel sounds which may be present in plural responses in favor of more readily discirminable characteristics.

SECOND ALTERNATIVE EMBODIMENT

Figure 10:
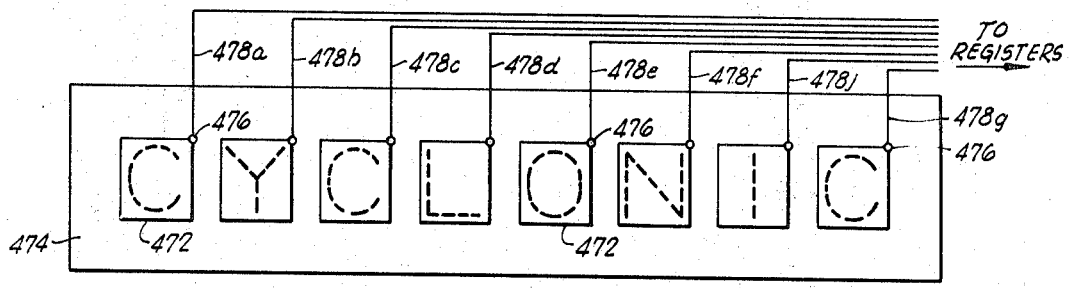
FIG. 10 illustrates a series of eight printing blocks and the manner in which a verbal response may be printed in to give a binary indication as output from each block.
Figure 9:
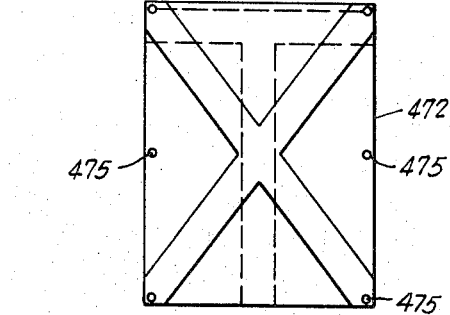
FIG. 9 shows a printing block with some associated coincidence determination points.

It is also possible to provide a means for hand writing a constructed verbal response such that predetermined binary characteristics can be compared with selected characteristics of a required response to derive an indication of correctness. As shown in FIGS. 9 and 10, a constructed verbal response may be printed in block letters of predetermined form within sequentially spaced letter-size rectangles 472 disposed linearly along, for example, a template or face 474. In this case, there are eight such letter boxes 472 and this gives the response system a $2^8$ or about a 250 to 1 discrimination capability.

FIG. 9 illustrates the manner in which binary characteristics may be selected for printed block letters. A plurality of selectively located spots 475 may be employed for discriminating letters in accordance with whether or not certain ones of spots 475 fall in the letter form. Thus, the presence of the letter form at all four corner spots 475 will always identify the letter "x" and discriminate it as not "t." Similarly, the two upper corner spots 475 will indicate a "t" and a not "x." The order of discrimination capability can be made as high as desired simply by increasing the number and/or strategically locating the identifying spots 475. The present use in a highly prompted system requires only the use of a minimum of spots 475. Thus, sufficient discrimination of letters is afforded by employing a single spot 475 and employing electrical means for detecting presence or no presence of a letter form.

Referring to FIG. 10, a small switch assembly 476 is located in the upper right hand corner of each of the letter blocks 472 and each of switches 476 energizes one of leads 478a through h which are connected to respective ones of eight binary code addresses. Thus, a student may write block English letters in the rectangular letter blocks 472 so that each of switches 476 will either be actuated or not to give a binary indication. The letters E, F, H, J, K, M, N, T, U, V, W, X, Y, Z will operate switches located in the upper right hand corner, while letters A, B, C, D, G, I, L, O, P, Q, R, S will not, this enabling a probability of 53 percent in normal English communication.

Such a verbal answering device utilizes eight binary places arranged in word-spelling order such that about a 250:1 discrimination results. This becomes a very high order of discrimination capability when considered in use with a highly prompted tutoring system which is on the order of ninety percent correct. As shown in FIG. 10, the word "CYCLONIC" is written in block form into the letter blocks 472 and this answer is represented binarily as "11101101," i.e., a binary one resulting when switch 476 is closed by the letter or writing implement as it may be, and a binary zero resulting when switch 476 is not touched. Thus, in a programmed course on electronics, some typical answers may be "RESISTANCE" binarily represented as 01000101; "AMPHERE" binarily represented as 01010100, and so forth.

The specific hardware employed in constructing a print response system allows a considerable latitude of choices. The switch members 476 may be comprised of simple conductive tabs which serve to close a circuit through leads 478a–h when contacted by a conductive writing probe. It is also contemplated that photoelectric means can be used for discrimination of printed words. One such form is where a lucite or glass plate receives answers printed by bright-colored crayon or such and rear-reflected light is photoelectrically sensed, i.e. a binary location sensor. It is fully expected that numerous other binary code recognition devices will be suggested to those skilled in the art.

The foregoing discloses a novel method and apparatus for providing a verbal response and discriminating the response against a known or correct response. In accordance with the teachings, any one of three different communication modes may be employed to present an elicited response for discrimination with respect to the known or correct response. The method allows a very occasional error to go unnoticed, acceptance of an incorrect answer as correct, but relegates the fact to a minor order due to the fact that audible reinforcement will tend to refute or dis-harmonize, and due to the inherent high order of correctness in most programmed teaching systems. This planned sacrifice or deviation from total accuracy enables utilization of response input and binary recognition circuitry which is greatly simplified.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. A method of discrimination of constructed verbal responses, comprising the steps of:
    conditioning a plurality of addresses in accordance with selected binary characteristics of a predetermined verbal response, each of said addresses consisting of a register disposed at one or the other binary states, one state indicating a binary characteristic contained in a correct constructed verbal response and the other state indicating a binary characteristic not contained in a correctly constructed response;
    disseminating information to a subject and eliciting a verbal response;
    constructing a verbal response utilizing selected binary characteristics less than the total number of said binary characteristics which represent said elicited verbal response;
    comparing selected binary characteristics of said predetermined verbal response with binary characteristics of said constructed verbal response;
    limiting the number of selected binary characteristics of the constructed verbal response to less than the total number of said predetermined verbal response binary characteristics; and
    determining whether or not the lesser number of selected binary characteristics from the constructed verbal response are present within the total number of selected binary characteristics of said predetermined verbal response so that all correct responses are accepted as correct even though an occasional incorrect response may be also be accepted as correct.

2. A method as set forth in claim 1 wherein said step of constructing a verbal response comprises:
    activating a selected one of a plurality of channels in accordance with a selected binary characteristic of the spelling out of the response, each channel representing a group of different alphanumeric characters, said groups being selected in accordance with probability of usage so that each of said plural channels carries approximately the same probability of usage with respect to character selection for alphanumerically constructed verbal response in the English language.

3. A method as set forth in claim 1 wherein said step of constructing a verbal response comprises:
    uttering a verbal response;
    detecting said verbal response and dividing it into plural, predetermined tonal qualities;
    activating a selected one of a plurality of channels in accordance with selected binary characteristics of respective ones of said tonal qualities.

4. A method as set forth in claim 1 wherein said step of constructing a verbal response comprises:
    writing a verbal response as a series of letters in predetermined, printed block form; and
    activating a selected one of a plurality of channels in accordance with a selected binary characteristic of each printed letter.

5. A method as set forth in claim 1 which is further characterized to include the steps of:
    providing audible or visible reinforcement with each comparison of a constructed verbal response.

6. Apparatus for constructing a verbal response comprising:
    means having a plurality of address positions;
    means for deriving a first plurality of selected binary characteristics indicative of a predetermined verbal response;
    means for conditioning each address position with a selected binary characteristic of said predetermined verbal response;
    means for constructing a verbal response by transducing a spoken verbal response and providing an audio frequency electrical signal output which represents a second plurality of selected binary characteristics;
    a plurality of frequency-responsive channels connected in parallel and receiving audio frequency electrical signal at the input, each of said plural channels providing a binary output indicating presence or absence of electrical signal within a predetermined frequency range;

means applying each of said second plurality of binary characteristics to one of said conditioned address positions; and means comparing binary characteristics from said first and second pluralities at said address positions to determine similarity between said predetermined verbal response and said constructed verbal response.

7. Apparatus as set forth in claim 6 which is further characterized in that:

each of said frequency-responsive channels is tuned for discrimination of frequencies which appear in the formants of spoken vowel or sibilant sounds.

8. Apparatus as set forth in claim 6 wherein said means having a plurality of address positions comprises:

a plurality of bi-stable circuit means each receiving an input from said means for conditioning each address position, and each having its conduction state controlled in accordance with a selected binary characteristic of said predetermined verbal response.

9. Apparatus as set forth in claim 8 wherein said means comparing binary characteristics from said first and second pluralities at each address position comprises:

bi-stable conduction means receiving an input from said bi-stable circuit means in a first conduction state to place said bi-stable conduction means in a first conduction state; and means responsive to said bi-stable conduction means in its first conduction state to receive one of said second plurality of selected binary characteristics from said means for constructing a verbal response to generate an acceptance indication denoting the constructed verbal response the same as the predetermined verbal response.

10. In combination with teaching machines or information dissemination apparatus of the type which plays audio information and/or coordinated visual information and elicits a student response, constructed verbal response apparatus comprising:

a plurality of bi-stable conduction means having first and second conduction state outputs and each being connected to be activated to a first conduction state by a first electrical input;

a plurality of normally-open key switch means having first and second contacts with said first contacts connected to a first conduction state output of each of said bi-stable conduction means;

error bi-stable conduction means having the input connected in parallel to said second contacts of each of said key switch means and indicating an incorrect response when activated;

first means coordinated with said information dissemination and elicited response for generating a plurality of first electrical input signals identifying selected binary characteristics of a predetermined verbal response, each of said first electrical input signals being applied to the input of one of said bi-stable conduction means to place it in a first conduction state; and second means for constructing a verbal response which includes means for sensing selected binary characteristics of the constructed verbal response and actuating selected key switch means in accordance therewith such that said error bi-stable conduction means is not activated as long as the actuated key switch means are connected to one of the bi-stable conduction means which is in the first conduction state.

11. Constructed verbal response apparatus as set forth in claim 10 wherein said first means comprises:

receiver means picking up a plurality of code signals of different frequency control tones, said code signals being disseminated in coordination with said audio information;

plural control signal channels;

filter means for conducting each different code signal to one of said plural control signal channels; and means applying the output of selected ones of said control signal channels to said first electrical inputs of selected bi-stable conduction means.

12. Constructed verbal response apparatus as set forth in claim 10 wherein said first means comprises:

plural code indications disseminated in coordination with said visual information;

plural control signal channels;

plural photoelectric detectors for sensing each of said code indications and providing a binary control signal for input to each of said control signal channels; and means applying the output of each of said control signal channels to said first electrical inputs of selected bi-stable conduction means.

13. Apparatus for constructing a verbal response comprising:

means having a plurality of address positions;

means for deriving a first plurality of selected binary characteristics indicative of a pre-determined verbal response;

means for conditioning each address position with a selected binary characteristic of said predetermined verbal response;

means for constructing a verbal response by generating a second plurality of selected binary characteristics, such means consisting of means for printing successive letters of a verbal response in a series of letter blocks, and further means for detecting presence or absence of a letter character at a preselected point in each of said letter blocks and providing a binary electrical output indicating the sense of each letter block;

means applying each of said second plurality of binary characteristics to one of said conditioned address positions; and means comparing binary characteristics from said first and second pluralities at said address positions to determine similarity between said predetermined verbal response and said constructed verbal response.

14. Apparatus as set forth in claim 13 which is further characterized in that:

said preselected point in each of said letter blocks is the upper, right-hand corner and gives a discrimination ratio of fifty-three percent with respect to all letters as used in the English language.

15. Apparatus for constructing a verbal response comprising:

means having a plurality of address positions;

means for deriving a first plurality of selected binary characteristics indicative of a pre-determined verbal response;

means for conditioning each address position with a selected binary characteristic of said predetermined verbal response;

means for construcing a verbal response by generating a second plurality of selected binary characteristics, said means consisting of a plurality of typing keys each repreesnting one of the alpha numeric characters, and plural switch means each actuated by one of said typing keys to provide an electrical output, each of said electrical outputs being connected in parallel with a preset number of like electrical outputs to form a plurality of group output binary characteristics of lesser number than said switch means electrical outputs, the grouping of alpha numeric characters of each of such groups having approximately equal probability of usage with respect to English language verbal response;

means applying each of said second plurality of group binary characteristics to one of said conditioned address positions; and means comparing binary characteristics from said first and second pluralities at said address positions to determine similarity between said predetermined verbal response and said constructed verbal response.

16. Apparatus as set forth in claim 15 which is further characterized in that:

said typing keys are connected as six groups of parallel-connected keys of three letter characters each and two groups of parallel-connected keys of four letter characters each, each of the eight groups providing a respective group output and having approximately equal probability of usage with respect to English language verbal response.

References Cited

UNITED STATES PATENTS

| | | | |
|---|---|---|---|
| 3,052,041 | 9/1962 | Luxton et al. | 35—9 |
| 3,218,921 | 11/1965 | Grosvenor et al. | 35—8X |
| 3,504,446 | 4/1970 | Brunell et al. | 35—9 |
| 3,504,447 | 4/1970 | Brudner | 35—9 |

WILLIAM H. GRIEB, Primary Examiner

U.S. Cl. X.R.

35—6